Patented Nov. 8, 1932

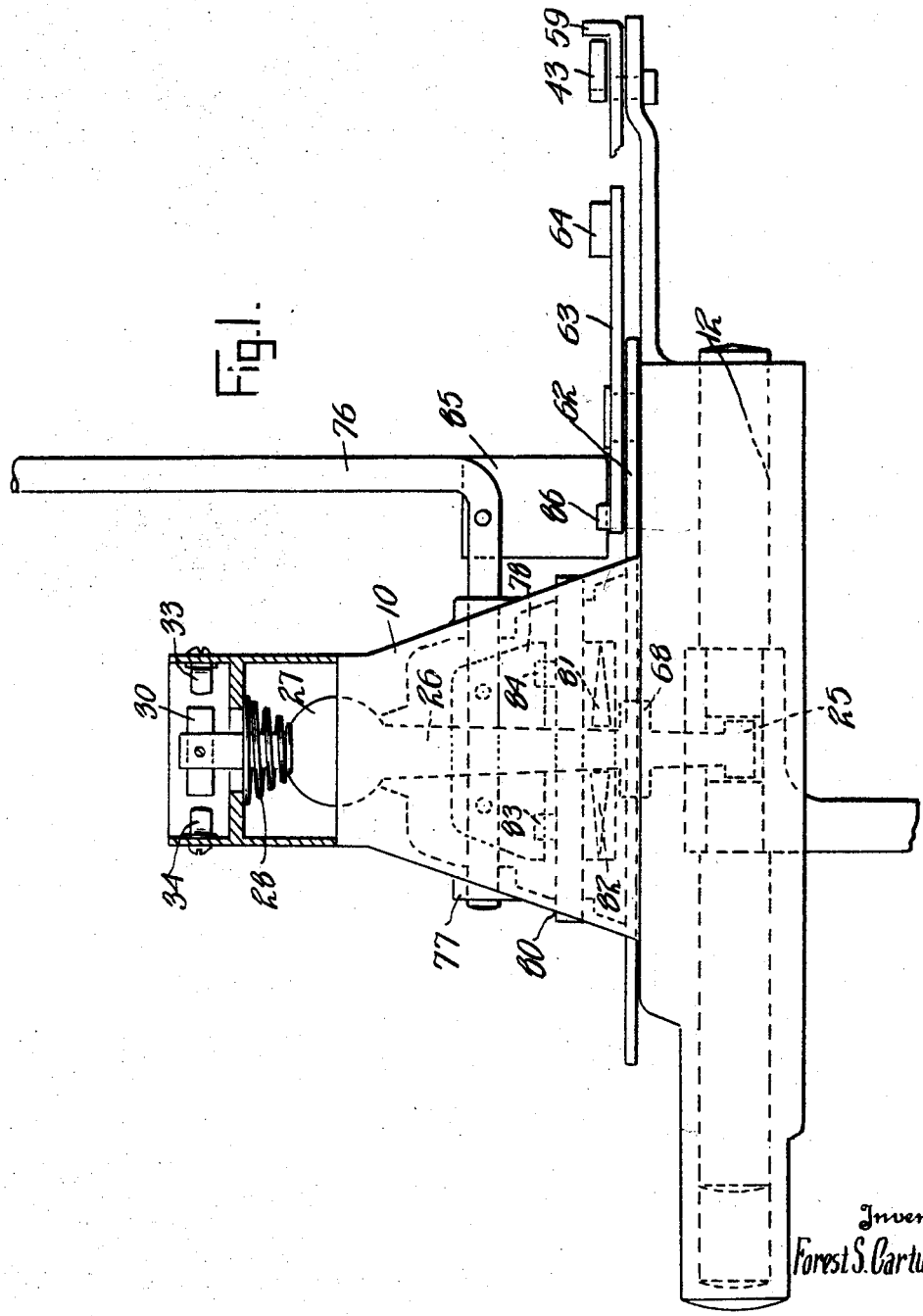

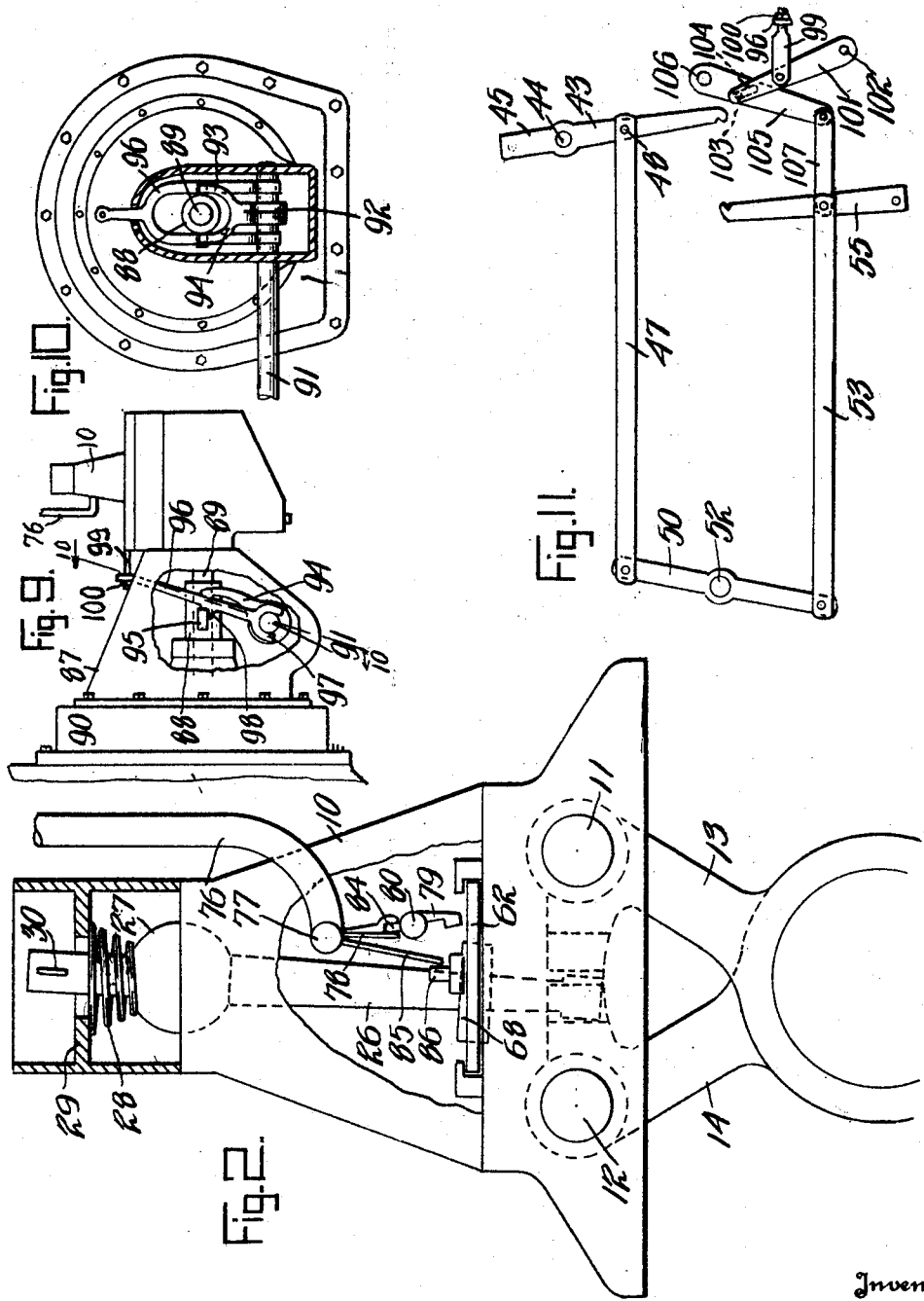

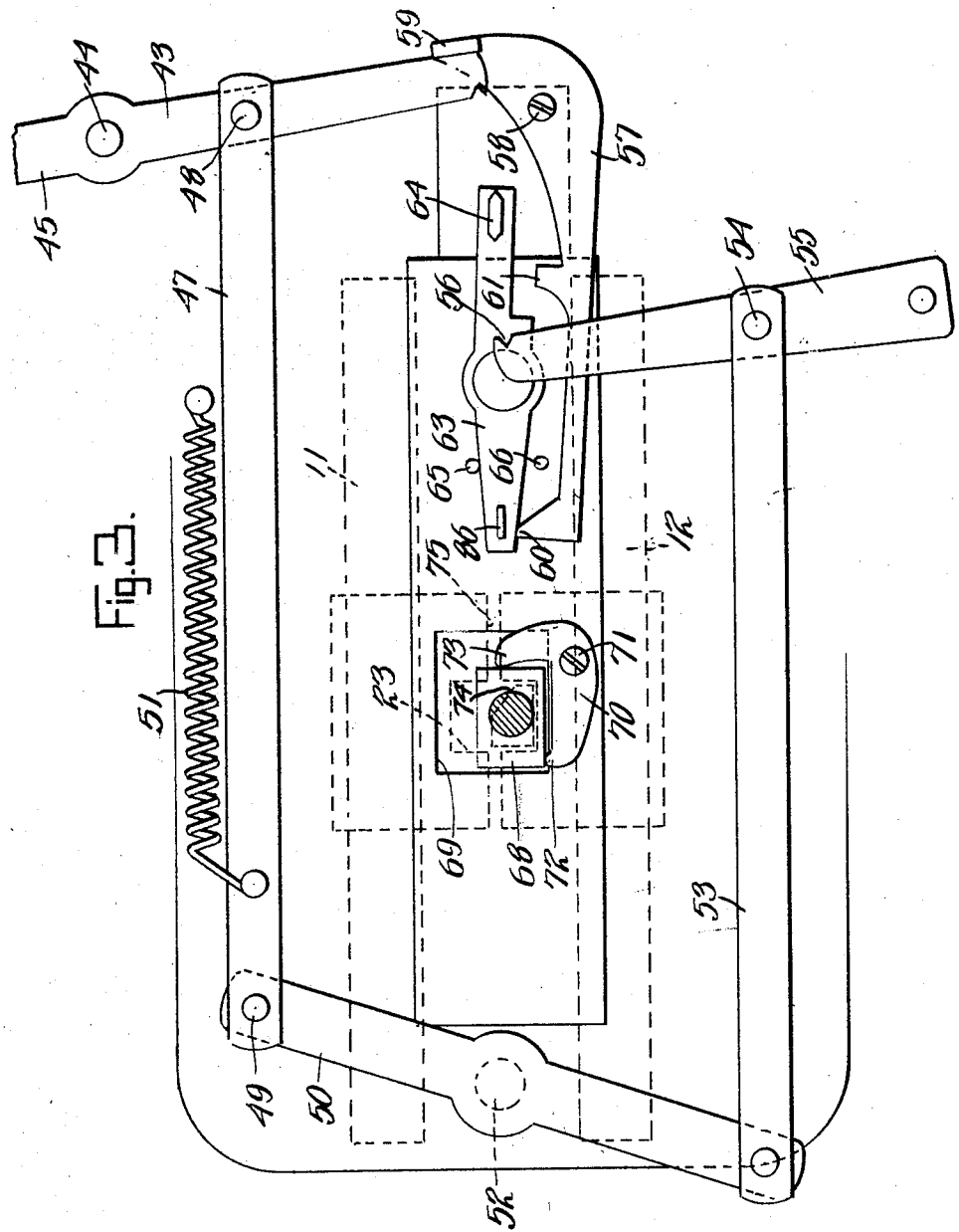

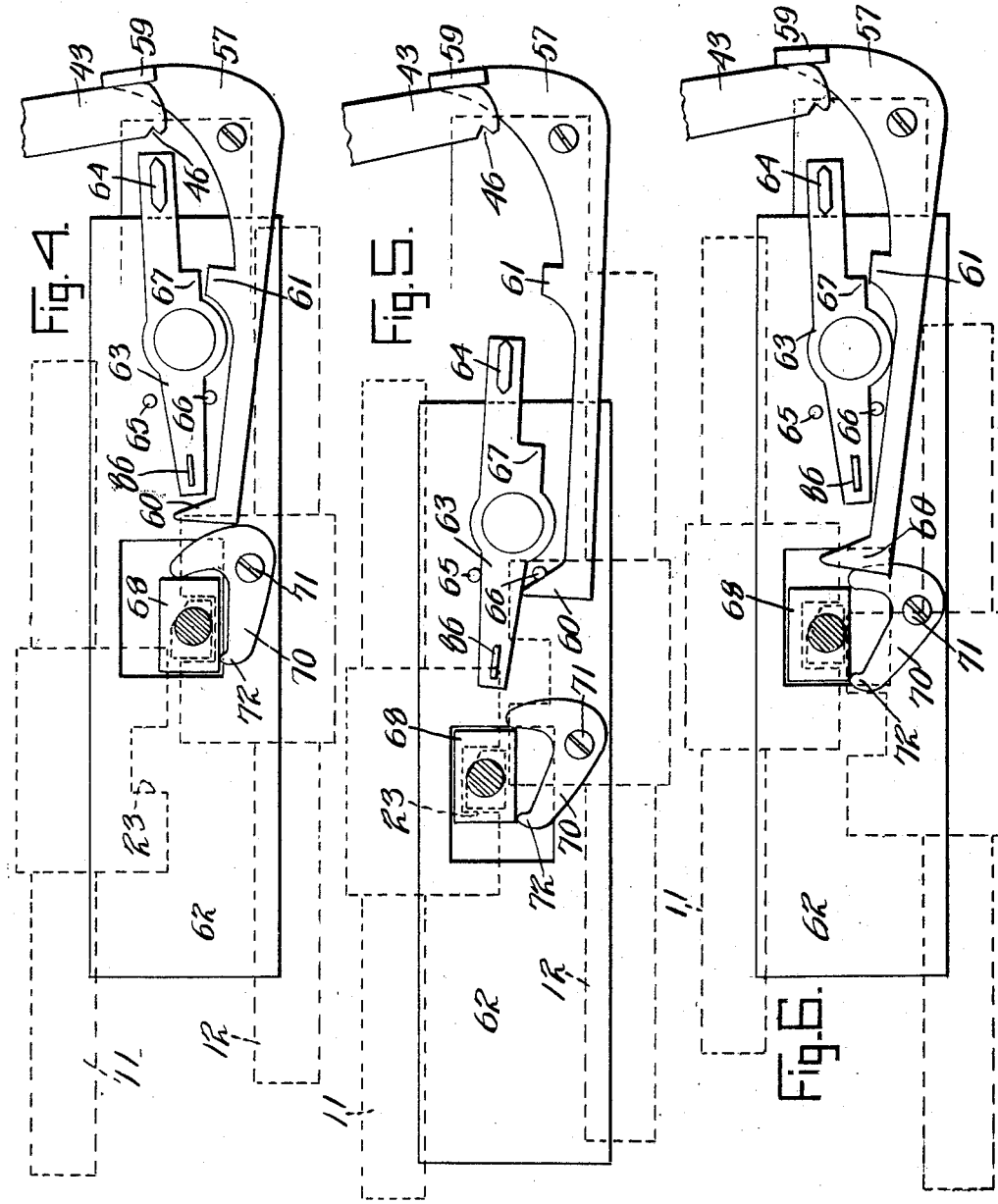

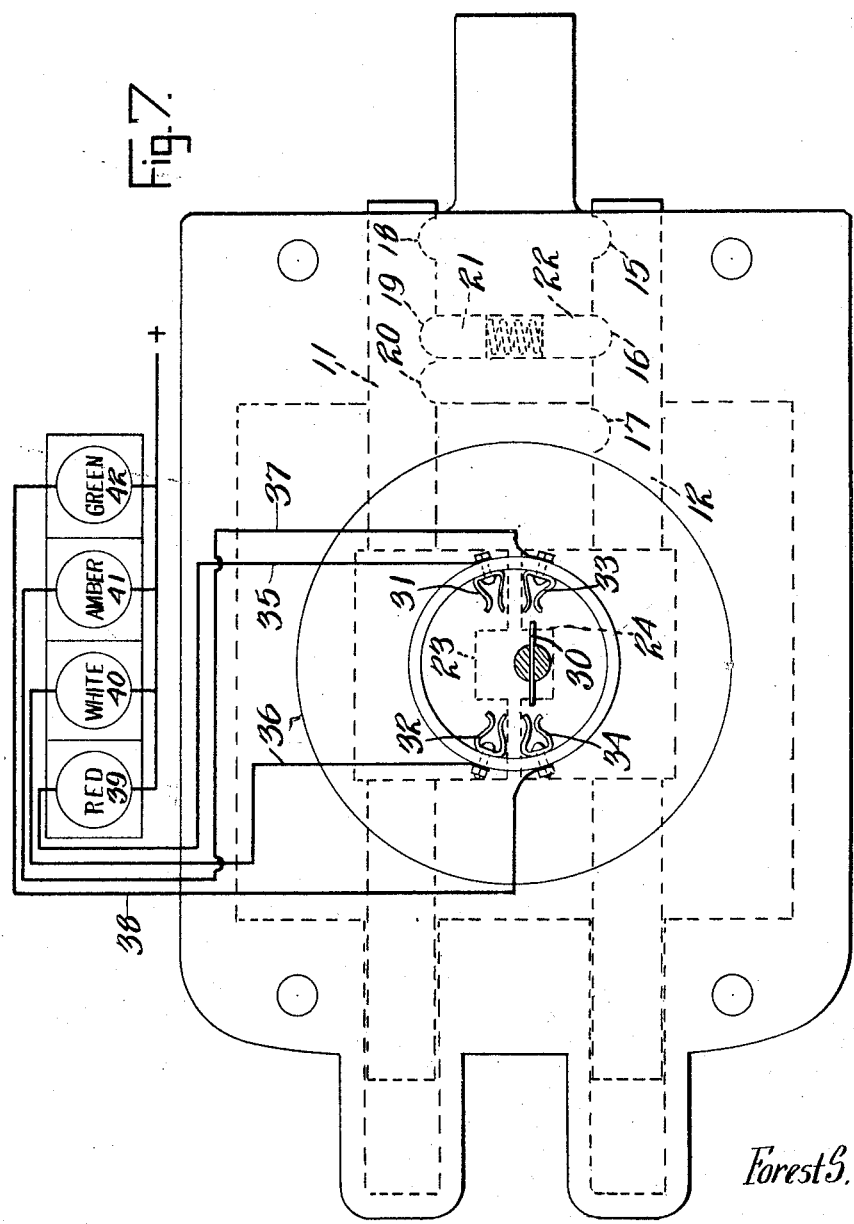

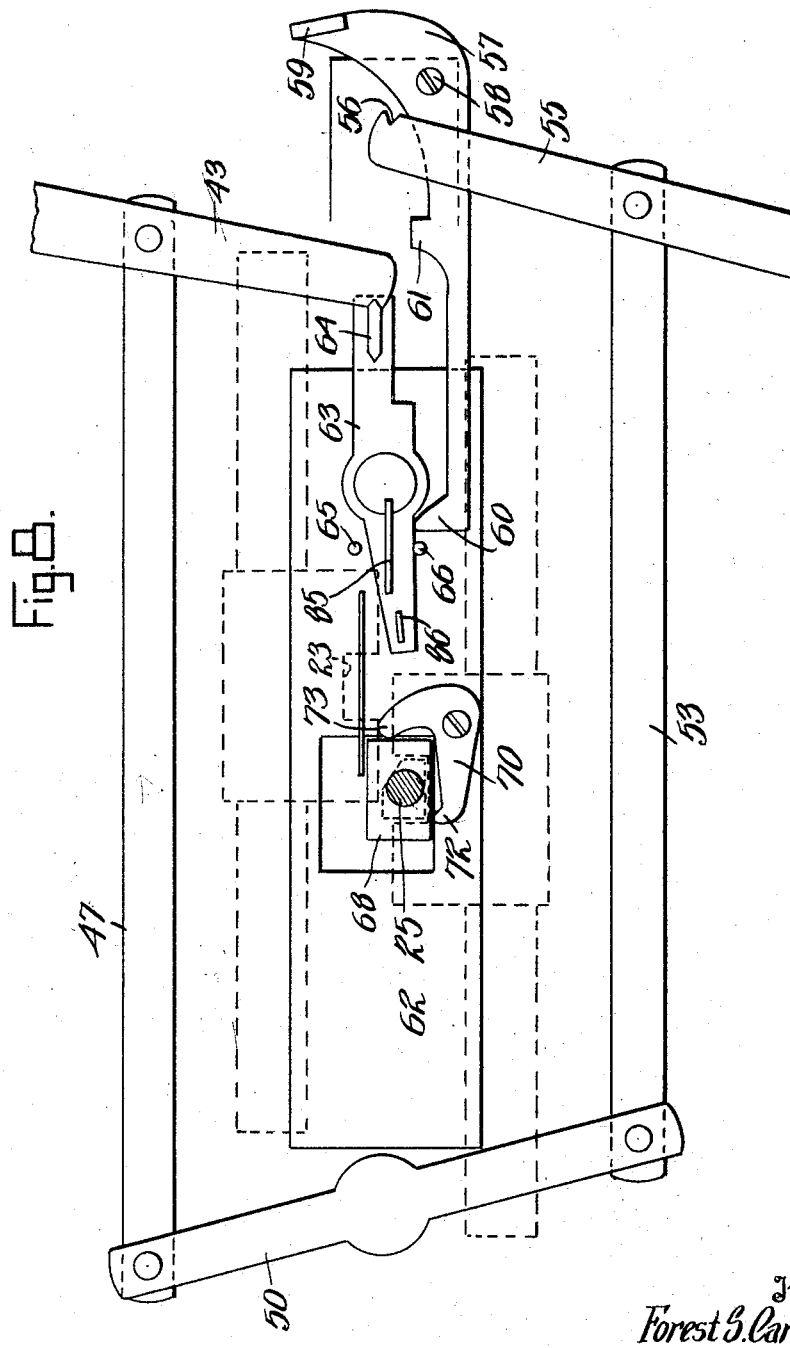

1,887,012

UNITED STATES PATENT OFFICE

FOREST S. CARTWRIGHT, OF INDIANAPOLIS, INDIANA, ASSIGNOR TO CARTWRIGHT AUTOMATIC GEAR SHIFT CORPORATION, OF INDIANAPOLIS, INDIANA, A CORPORATION OF INDIANA

GEAR SHIFT

Application filed June 27, 1930. Serial No. 464,399.

This invention relates to mechanism for shifting gears and is an improvement on my co-pending application Ser. No. 347,582, filed March 16, 1929, and an object of the invention is to provide means for shifting the gears into all of the several positions by means of the automobile pedal without the assistance of ordinary gear shifting levers.

A further object is to provide signal means for showing the position in which the gears are at any given time.

Further objects and advantages will become apparent as the description proceeds.

Referring to the accompanying drawings, which are made a part hereof and on which similar reference characters indicate similar parts, Figure 1 is a side elevation of a housing showing my invention positioned therein, Figure 2, a front elevation of the same, Figure 3, a plan view showing the position when the gears are in neutral position, Figure 4, a partial plan view when in low speed, Figure 5, a similar partial plan view showing the position when the gears are in intermediate or second speed, Figure 6, a similar partial plan view showing the position for high gear, Figure 7, a partial plan view with certain details omitted to show the electrical connection together with the signals for indicating the speed position of the mechanism at the different positions of the clutch pedal, Figure 8, a plan view showing the gears in reversed position.

Figure 9, a view showing how my device is operated from the clutch pedal of an automobile, Figure 10, a section on line 10—10 of Fig. 9, and Figure 11, a detail view of the levers, links and other clutch pedal and the gear shifting mechanism.

Numerals 10 indicates the housing for the gear shifting mechanism of many makes of standard automobiles in which are mounted gear shifting rods 11 and 12 of standard construction, these rods being connected by means of arms or fingers 13 and 14 with the necessary connection for shifting the gears. The gear shifting rods 11 and 12 are notched on their inner sides near their forward ends at 15, 16, 17, 18, 19 and 20 in which spring pressed plungers 21 and 22 may seat to lock the rods in the respective positions corresponding to low, intermediate, high and reverse positions of the gears. As shown in Figure 7 the rods are locked in position in which the gears are in neutral position. The position of the rods to correspond with the other positions of the gears should be apparent to any one familiar with automobile transmission gears and need not be here further described. The rods 11 and 12 respectively are provided with notches 23 and 24 in which the end 25 of a gear shifting lever 26 engages to move these rods to the several positions corresponding to the several positions of the gears.

The gear shift lever 26 has a spherical portion 27 near its upper end which seats in a corresponding socket in the upper portion of the housing 10 so as to be allowed the necessary swinging motion to allow the lower end to engage a notch in the side of the yoke on either of the rods 11 or 12. A spring 28 seated around the upper end of the lever 26 rests against shoulders 29 on the housing at its upper end and against the top of the spherical portion 27 at its lower end to hold the lever 26 so as to maintain the lower end in position at all times to engage with the notches in the yokes on the gear shifting rods when moved into the correct position.

The upper end of the lever 26 has a short bar 30 inserted radially therein to provide a means for contacting with any one of several contacts 31, 32, 33 or 34. The contacts 31 to 34 inclusive are connected by means of wires 35, 36, 37 and 38 respectively to lights 39, 40, 41 and 42 which lights are red, white, amber and green and indicate reverse gear, low gear, intermediate and high gear respectively. When the gears are in neutral none of the lights are lit since the lever contact 30 will be out of engagement with all of the switches.

Means for swinging the lever 26 to move the end 25 to engage with the gear shifting rods and to move these rods forward or backwards will now be described. A lever 43 is pivoted at 44 upon any suitable stationary portion of the housing or in other position. The end 45 of this lever may be connected with the automobile clutch pedal so that when this pedal is moved the clutch will first be disconnected and then the lever 43 swung on its pivot 44. The details of one form of connection with the clutch pedal will later be described. The inner end of the lever 43 is notched at 46. A link 47 is pivotally connected to the lever 43 at 48, which link at its other end is pivoted at 49 to a lever 50. A spring 51 is secured upon the gear housing at one end and at its other end to the link 47 and tends to move the end of the lever 43 forward. The lever 50 is pivoted at 52 to the housing and has a link 53 pivoted to its other end, the link 53 being pivotally connected at its forward end at 54 to a lever 55 which latter lever is notched at its inner end at 56. A lever 57 is pivoted at 58 to the gear housing and has its forward end turned up or otherwise provided with a lug 59 against which the inner end of the lever 43 engages, when this lever is in its forward position. The lever 43 urged in its forward position by the spring 51 tends to swing the lever 57 in a clockwise direction on its pivot pin 58. The rear end of the lever 57 is provided with a cam-like projection 60 and intermediate the ends it is provided with an inwardly extending lug 61, the purpose of which lugs will become apparent as the description proceeds. The lever 26 extends through a plate 62. An oscillating bar 63 is pivotally attached to the plate 62 near its forward end. The forward end of the bar 63 has an upstanding lug 64 and the rear end of the bar 63 is positioned between stop pins 65 and 66. The right forward side of the bar 63 also has a shoulder 67, which is engageable by the projection 61 on the lever 58 to swing the bar 63 counterclockwise when the plate 62 is in its forward position and the lever 43 rests against the lug 59. The lug 60 on the lever 57 engages the rear end of the bar 63 to swing this bar in a clockwise direction when the plate 62 is in its rear position. The purpose of swinging the bar 63 is to position the lug 64 in the path of the notch 56 on the lever 55 or in the path of the notch 46 on the lever 43 so that when these levers are swung, plate 62 will be moved forward or backward carrying with it the gear shifting lever 26 and the gear shifting rods 11 and 12. The gear shifting lever 26 is provided with a rectangular portion 68 which fits in a rectangular opening 69 in the plate 62. The opening 69 is larger than the rectangular portion 68. A dog 70 is pivoted at 71 to the plate 62. The rear end of this dog extends in at 72 and engages the side of the rectangular portion 68 of the lever 26 and a forward arm 73 of the dog engages the forward side of element 68. The purpose of the dog 72 is to shift the end 25 of the lever 26 from the notch 24 of the rod 12 into the notch 23 of the rod 11 as the lever 26 is swung to the rear. The end 25 of the lever 26 has a beveled portion 74 to assist movement of the portion 25 into the notch 23.

The operation of the apparatus so far described is as follows:

Assume that the gears are in neutral, as indicated in Figures 1 and 3. The operator pushes in the clutch pedal, this swings lever 43 in a clockwise direction to move lever 55 in clockwise direction, and the notch 56 engaging the rear side of lug 64 on the oscillating bar 63 will move the plate 62 forward. Since in starting from neutral the lower end 25 of the lever 26 is in the notch 24 the rod will be moved forward to low gear position and the plunger 22 engages the notch 17 to lock them in low gear position. The clutch pedal is then released; as the parts are returned to normal position by means of the spring 51 the end of the lever 43 strikes against the lug 59 and swings the lever 57 on its pivot. Since the rear end of the oscillating bar 63 is now too far forward to be engaged by the lug 60 on the lever 57 and the shoulder 67 is in position to be engaged by the lug 61 the oscillating bar 63 will be rocked on its pivot in a counterclockwise direction to swing the lug 64 into the path of the notch 46 on the bar 43. When the clutch pedal is again pushed out and the lever swung as before the lever 43 will move the plate 62 to the rear carrying with it the gear shifting lever 26 together with the rod 12. It should be noted that the clutch shifting lever 26 is not in direct contact with the plate 62 as this plate is moved to the rear but that engagement is made through the dog 70. The dog 70 is pivoted at 71 at the side of the rectangular shaped portion 68 on the lever 26 so the lever 26 and the rod 12 are moved to the rear by means of the dog and the force acting on the dog is at one side of the lever 26, hence the point 72 normally tends to move the lever 26 toward the rod 11. It cannot, however, move far in that direction due to the fact that the end 25 is in contact with a face 75 on the yoke on the rod 11. The end 26 therefore cannot enter the notch 23 until the rods have reached substantially neutral position, at which time the end 72 on the dog will shove the end 25 on the lever 26 into the notch 23. As the plate 62 now continues to the rear the rod 11 will be moved to the rear to position the gears in the intermediate gear position, in which position the rods are shown in Figure 5. When the clutch pedal is released again the levers 43 and 55 are returned to normal position again by the spring 51 which is the position shown in Figure 5. As the levers returned to these positions the end of the lever 43 coming to rest against the lug 59 rocked the lever 57 on its pivot again whereupon the end 60 of the lever 57 rocked the oscillating bar 63 clockwise to position the lug 64 in the path of the notch 56. When the clutch pedal is again pushed out the lever 55 moving forwardly will carry the plate 62 with it and since the end 25 of the lever 26 is already in the notch 23 on the rod 11, this rod will be moved forward to the high gear position which is the position shown in Figure 6. As the levers 43 and 59 again return to normal the lever 43 will strike the lug 59 and since the oscillating bar 63 is in its forward position the bar 61 will strike the shoulder 67 and swing the bar counterclockwise to move the lug 64 into the path of the notch 46 on the lever 43. When the clutch pedal is again pushed out the rod 11 will be moved back to the intermediate gear position. It will therefore be seen that the gears may shift from high to intermediate and from intermediate back to high indefinitely by simply pushing out the clutch pedal. This is as it should be for in driving an automobile the shifting will generally be from intermediate to high and from high back to intermediate without going either into neutral or low gear. Mechanism for operating the lever 26 for reverse gear position will now be described. A lever 76 has its lower bent over end journaled at 77 in the housing 10. This lever has a plate 78 secured to its lower side. A plate 79 is secured to a rod 80 which likewise is journaled in the housing 10. The plate 79 has raised shoulders 81 and 82 on one side. Shaft 80 has lugs 83 and 84 over which the slotted lower side of the plate 78 engages, to swing the plate 79 in a clockwise direction, as shown in Figure 2 when the lever 76 is moved in a counterclockwise direction as shown in Figure 2. When the swinging clutch lever 26 therefore comes to neutral position the shoulders 81 and 82 will straddle it to stop it in half-way position, which is the neutral position. The plate 79 acting under the impulse from the lever 76 will then push the end 25 of the lever 26 into the notch 24 in the rod 12. This puts the gears in position for reverse. In going into reverse from neutral position means must be provided for positioning the oscillating bar 63 in position to have the lug 64 engaged by the notch 46. There is therefore a spring plate 85 secured to the bar 76. This plate engages a short lug 86 on the rear of the oscillating bar 63. When the plate 79, therefore, is swung over to position the end 25 in the notch 24, the spring 85 swings the oscillating bar 63 in a counterclockwise direction to position the lug 64 to be engaged by the bar 43 to move the rod 12 to reverse gear position.

Upon returning to neutral from any position it is desirable that all elements be positioned so that the first movement thereafter will be into low gear. In order to do this it is necessary that the end 25 of the gear shift lever 26 shall always be positioned in the notch 24 following neutral position. This is done by the neutral control plate 79 which swings sufficiently inward to press the gear shift lever 26 to the right so that the end 25 will properly be located in the slot 24 of the right gear shifting rod 12. The spring 28 will always maintain the end 25 of the lever 26 in position in the notches in the rods 11 and 12.

The operating mechanism connecting the clutch pedal on the automobile and the gear shifting mechanism will now be described.

This mechanism is shown in detail in Figures 9, 10 and 11. Numeral 87 indicates the housing for the clutch shifting mechanism. Within this housing is mounted a shaft 89 having a collar 88 slidably mounted thereon. The collar 88 is attached to the usual clutch disks (not shown) within the casing 90. The automobile pedal not shown is connected to the end of a shaft 91. A yoke 92 is secured to this shaft and this yoke has on its upper end forks 93 and 94 which normally engage lugs 95 on the side of the collar 88. This is the construction of the usual mechanism by means of which the clutch is operated from the pedal. I provide an inverted U-shaped member 96 which straddles the collar and has forked ends 97 which fit over the shaft 91. In order to hold the U-shaped member upon the shaft 91, lugs are provided on one side which lugs engage beneath the lugs 95 on the collar 88. The U-shaped member 96 is positioned between the ends 93 and 94 of the yoke and the lugs 95. A rod 99 is secured in the upper end of the U-shaped member and may be adjustable axially by means of a nut 100. The rod 99 is attached at its other end to a lever 101 which is pivoted at 102 on any rigid portion of the machine. The other end of the lever 101 has a pin 103 which engages an oblique slot 104 in a lever 105. The lever 105 is pivoted at one end at 106 and has a link 107 connecting the other end at 54 on the lever 55. When the clutch pedal is pushed out therefore the mechanism just described will operate to oscillate the lever 55 to shift the gears through the different cycles which have been described. Particular attention is invited to the position which the slot 104 occupies in the lever 105. By making an oblique slot a slight movement of the lever 101 will give a magnified movement to the lever 105 at the beginning of its movement. As the movement of the lever 105 continues its movement with relation to the lever 101 decreases due to the fact that the pin 103 is allowed to slide in the slot which slot is changing its direction at each movement of the lever 105 in a counterclockwise direction. This gives a quick initial movement to the lever 105 with all of the mechanism attached to it and a slower movement as it reaches the limit to which it moves. This is as it should be, for this provides a quick disengagement of the clutches in shifting from one speed to another. The lever mechanism shown in Figure 11 moreover multiplies the movement between the U-shaped member 96 and the lever 55. The clutch disks within the housing 90 move only a very short distance, the rod 99 traveling only about one inch. The gears in the transmission must be moved about two and one quarter inches. The lever mechanism shown multiplies the distance through which the lever 99 moves to give the necessary movement to the transmission gears.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. In a gear shifting mechanism, a pair of gear shifting rods having yokes thereon, a gear shifting lever pivoted at one end and having its other end engageable with one of the said yokes, a housing, a plate mounted to slide in said housing said plate having a hole therethrough through which the gear shifting lever extends, and means on the plate for shifting the end of the said gear shifting lever to cause it to engage in one of the said yokes, substantially as set forth.

2. In a gear shifting mechanism, a pair of gear shifting rods having notched yokes thereon, a gear shifting lever pivoted at one end and having its other end movable to engage in the notches in the yokes, a housing, a plate mounted to slide in said housing, said gear shifting lever extending through the said plate, and means on the plate for moving the said lever to cause its end to engage in the said notches to move the said gear shifting rod in proper sequence for low, intermediate and high gear positions, substantially as set forth.

3. A gear shifting mechanism for automobiles comprising a housing, a pair of gear shifting rods mounted in the housing said rods having notched yokes thereon, a plate mounted to slide in said housing parallel with said rods, a gear shifting lever pivoted to said housing and extending through said plate and having its free end engageable with the notches in the said yokes, means on the plate for moving it forward and backward to move said gear shifting lever to move the gear shifting rod with which its end is engaged, and means on the said plate for shifting the end of the gear shifting lever from the notch in one yoke into the notch in the other yoke as the plate is moved to the rear, substantially as set forth.

4. A gear shifting mechanism for motor vehicles comprising a housing, a pair of gear shifting rods mounted in said housing said rods having notched yokes thereon for moving them to the several positions corresponding to the several speed positions, a plate mounted to slide in said housing, a gear shifting lever pivoted at one end in said housing and extending through the plate and having its other end engageable with either of the notches in either of the said yokes, an oscillating bar mounted on said plate having a lug thereon, means for operating the plate engageable with the said lug, and means for oscillating the bar to position said lug in the path of the said means for operating the plate to move the plate forward or backward to position the gear shifting rods in any of the several positions corresponding to the different speeds of the vehicle, substantially as set forth.

5. A gear shifting mechanism for motor vehicles comprising a housing, a pair of gear shifting rods mounted in said housing said rods having notched yokes thereon, a lever pivotally attached to the said housing and having its free end engageable with the notches in said yokes, a plate slidably mounted in the housing having means thereon engageable with the said lever for moving it forward or backward to move the gear shifting rod with which it is engaged, a pair of levers pivotally mounted on the said gear housing and operatively connected together and connected to a clutch pedal on the automobile, and means on the plate engageable by either of the levers by which the plate is moved forward or backward, substantially as set forth.

6. A gear shifting mechanism for motor vehicles comprising a housing, a pair of gear shifting rods mounted in said housing said rods having notched yokes thereon, a lever pivotally attached to the said housing and having its free end engageable with the notches in said yokes, a plate slidably mounted in the housing having means thereon engageable with the said lever for moving it forward or backward to move the gear shifting rod with which it is engaged, a pair of levers pivotally mounted on the said gear housing and operatively connected together and connected to a clutch pedal on the automobile, means on the plate engageable by either of the levers by which the plate is moved forward or backward, said last-named means comprising an oscillating lever having a dog thereon, and means for moving the said dog into position to be engaged by either one of the said pivoted levers whereby the said plate may be moved to move the gear shifting rod to a desired position, substantially as set forth.

7. A gear shifting mechanism for motor vehicles comprising a casing, a pair of gear shifting rods slidably mounted therein, said rods having notched yokes thereon, a lever engageable with the said notches, a plate slidably mounted in the said housing having means thereon for engagement with the said shifting lever, a pair of levers pivotally mounted on the said gear housing said levers being operatively connected together and connected to means operated from a clutch pedal on the motor vehicle, an oscillating bar mounted on the said plate, said bar having a lug on its forward end for engagement first by one of the said pivoted levers to move the said plate in one direction and then with the other of said pivoted levers to move the plate in the other direction, substantially as set forth.

8. A gear shifting mechanism for motor vehicles comprising a casing, a pair of gear shifting rods slidably mounted therein, said rods having notched yokes thereon, a lever engageable with the said notches, a plate slidably mounted in the said housing having means thereon for engagement with the said shifting lever, a pair of levers pivotally mounted on the said gear housing said levers being operatively connected together and connected to means operated from a clutch pedal on the motor vehicle, an oscillating bar mounted on the said plate, said bar having a lug on its forward end for engagement first by one of the said pivoted levers to move the said plate in one direction and then with the other of said pivoted levers to move the plate in the other direction, and a pivoted lever engageable by one of the first-named pivoted levers on its return to normal position for swinging the said oscillating bar in position to be engaged by the desired pivoted lever to move the gear shifting rods to the desired position, substantially as set forth.

9. In a gear shifting mechanism having a clutch pedal assembly and a transmission gear assembly with operative connection between the two, said operative connection comprising a shaft movable in the direction of its length, a lever pivoted at one end and having a pin on the other end, said shaft being pivoted intermediate the ends of the lever, a second lever pivoted at one end and operatively connected to gear shifting mechanism at its other end and having an oblique slot intermediate its ends, said pin on the first named lever engaging in said slot, substantially as set forth.

10. In a gear shifting mechanism having a clutch pedal assembly and a transmission gear assembly with operative connection between the two, said operative connection comprising a shaft movable in the direction of its length, a lever pivoted at one end and having a pin on the other end, said shaft being pivoted intermediate the ends of the lever, a second lever pivoted at one end and operatively connected to gear shifting mechanism at its other end and having an oblique slot intermediate its ends, said pin on the first named lever engaging in said slot, the said slot being positioned obliquely in such a position that when the said second lever is rocked on its pivot the direction of the slot will change, substantially as set forth.

In witness whereof, I have hereunto set my hand at Indianapolis, Indiana, this 23rd day of June, A. D. nineteen hundred and thirty.

FOREST S. CARTWRIGHT.